(12) United States Patent
Ishii

(10) Patent No.: US 8,798,031 B2
(45) Date of Patent: Aug. 5, 2014

(54) USER EQUIPMENT AND DOWNLINK SYNCHRONIZATION DETERMINING METHOD IN THE USER EQUIPMENT

(75) Inventor: Hiroyuki Ishii, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 748 days.

(21) Appl. No.: 13/058,448

(22) PCT Filed: Aug. 11, 2009

(86) PCT No.: PCT/JP2009/064159
§ 371 (c)(1),
(2), (4) Date: Apr. 15, 2011

(87) PCT Pub. No.: WO2010/018818
PCT Pub. Date: Feb. 18, 2010

(65) Prior Publication Data
US 2011/0182224 A1    Jul. 28, 2011

(30) Foreign Application Priority Data
Aug. 11, 2008 (JP) .................................. 2008-207129

(51) Int. Cl.
*H04J 3/06* (2006.01)
*H04W 56/00* (2009.01)
*H04W 76/04* (2009.01)

(52) U.S. Cl.
CPC ............ *H04W 56/005* (2013.01); *H04W 56/00* (2013.01); *H04W 76/048* (2013.01)
USPC .......................................... 370/350; 370/311

(58) Field of Classification Search
None
See application file for complete search history.

(56) References Cited

U.S. PATENT DOCUMENTS

| | | | | |
|---|---|---|---|---|
| 6,625,467 B2 * | 9/2003 | New et al. | ...................... | 455/525 |
| 6,738,364 B1 * | 5/2004 | Saunders | ...................... | 370/332 |
| 6,748,234 B1 * | 6/2004 | Agrawal et al. | ............... | 455/522 |
| 6,771,985 B1 | 8/2004 | Iinuma | | |
| 6,879,823 B1 * | 4/2005 | Raaf | .......................... | 455/414.1 |

(Continued)

FOREIGN PATENT DOCUMENTS

| | | |
|---|---|---|
| JP | 10-093498 A | 4/1998 |
| JP | 2001-148650 A | 5/2001 |
| JP | 2001-285181 A | 10/2001 |

OTHER PUBLICATIONS

Notification of Reasons for Rejection for Japanese Application No. 2010-524727 dated Mar. 19, 2013, with English translation thereof (6 pages).

(Continued)

*Primary Examiner* — Bunjob Jaroenchonwanit
(74) *Attorney, Agent, or Firm* — Osha Liang LLP

(57) ABSTRACT

To determine a downlink synchronization state in a DRX state or in a state in which uplink timing synchronization is not maintained in user equipment, a mobile station configured to perform communications with a radio base station determines a downlink synchronization state by comparing RSRP measured based on a downlink reference signal transmitted from the radio base station with Qrxlevmin notified from the radio base station when the mobile station is in a connected state in which a radio link with the radio base station is established and in the discontinuous reception state.

11 Claims, 8 Drawing Sheets

(56) References Cited

U.S. PATENT DOCUMENTS

| | | | |
|---|---|---|---|
| 6,978,138 B2* | 12/2005 | Japenga et al. | 455/436 |
| 7,430,420 B2* | 9/2008 | Derakhshan et al. | 455/452.2 |
| 8,060,153 B2* | 11/2011 | Jeong et al. | 455/574 |
| 8,265,682 B2* | 9/2012 | Bertrand et al. | 455/522 |
| 8,447,369 B2* | 5/2013 | Suzuki | 455/574 |
| 8,472,991 B2* | 6/2013 | Pelletier et al. | 455/517 |
| 8,565,684 B2* | 10/2013 | Bi et al. | 455/67.11 |
| 2004/0184416 A1* | 9/2004 | Woo | 370/318 |
| 2007/0287468 A1* | 12/2007 | Jeong et al. | 455/452.2 |
| 2008/0026744 A1* | 1/2008 | Frederiksen et al. | 455/425 |
| 2008/0076359 A1* | 3/2008 | Charpentier et al. | 455/63.1 |
| 2008/0085680 A1* | 4/2008 | Kim et al. | 455/69 |
| 2008/0130548 A1* | 6/2008 | Kaikkonen et al. | 370/312 |
| 2008/0137633 A1* | 6/2008 | Okamoto et al. | 370/342 |
| 2009/0034452 A1* | 2/2009 | Somasundaram et al. | 370/328 |
| 2009/0046573 A1* | 2/2009 | Damnjanovic | 370/216 |
| 2009/0088160 A1* | 4/2009 | Pani et al. | 455/436 |
| 2009/0185524 A1* | 7/2009 | Sammour et al. | 370/328 |
| 2009/0238098 A1* | 9/2009 | Cai et al. | 370/254 |
| 2009/0265543 A1* | 10/2009 | Khetawat et al. | 713/151 |
| 2010/0027510 A1* | 2/2010 | Balasubramanian et al. | 370/332 |
| 2010/0087197 A1* | 4/2010 | Iwamura et al. | 455/436 |
| 2010/0113057 A1* | 5/2010 | Englund et al. | 455/452.1 |
| 2010/0136992 A1* | 6/2010 | Harada et al. | 455/450 |
| 2011/0319065 A1* | 12/2011 | Dalsgaard et al. | 455/418 |
| 2012/0236717 A1* | 9/2012 | Saska et al. | 370/235 |
| 2012/0300651 A1* | 11/2012 | Kazmi | 370/252 |
| 2013/0044737 A1* | 2/2013 | Chun et al. | 370/336 |

OTHER PUBLICATIONS

3GPP TS 36.211 V8.3.0, May 2008, "Evolved Universal Terrestrial Radio Access (E-UTRA); Physical Channels and Modulation," 77 pages.

3GPP TS 36.300 V8.4.0, Mar. 2008, "Evolved Universal Terrestrial Radio Access (E-UTRA) and Evolved Universal Terrestrial Radio Access Network (E-UTRAN)," 126 pages.

3GPP TS 36.213 V8.3.0, May 2008, "Evolved Universal Terrestrial Radio Access (E-UTRA); Physical Layer Procedures," 45 pages.

3GPP TS 36.321 V8.2.0, "Evolved Universal Terrestrial Radio Access (E-UTRA) Medium Access Control (MAC) protocol specification," May 2008, 33 pages.

Ericsson, "Out of Synchronization Detection in E-UTRAN," 3GPP TSG-RAN WG4 Meeting #47bis, R4-081399, Munich, Germany, Jun. 16-20, 2008, 6 pages.

3GPP TS 36.214 V8.3.0, May 2008, "Evolved Universal Terrestrial Radio Access (E-UTRA); Physical layer—Measurements," 11 pages.

Ericsson, "Downlink out-of-sync," TSG-RAN Working Group 1 meeting #10, Beijing, China; TSG-RAN Working Group 4 (Radio) meeting #10, San Jose, California, Jan. 18-21, 2000, 5 pages.

Abstract of JP2001-285181, data supplied from the espacenet database—Worldwide, 1 page.

Abstract of JP10-093498, data supplied from the espacenet database—Worldwide, 1 page.

International Search Report issued in PCT/JP2009/064519, mailed on Nov. 17, 2009, 2 pages.

* cited by examiner

USER EQUIPMENT AND DOWNLINK SYNCHRONIZATION DETERMINING METHOD IN THE USER EQUIPMENT

TECHNICAL FIELD

The present invention relates to a user equipment and downlink synchronization determining method in the user equipment in which discontinuous reception control is applied to communications with a radio base station.

BACKGROUND ART

The communication system that is a successor to WCDMA and HSDPA i.e. the LTE (Long Term Evolution) has been studied by 3GPP that is the standardization group of WCDMA, and as a radio access scheme, OFDMA (Orthogonal Frequency Division Multiplexing Access) is defined in downlink, while SC-FDMA (Single-Carrier Frequency Division Multiple Access) is defined in uplink (for example, see Non-patent Document 1).

OFDMA is a system for dividing a frequency band into a plurality of narrow frequency bands (subcarriers), and assigning data onto each frequency band to perform transmission, actualizes high-speed transmission and is capable of enhancing spectral efficiency, by densely arranging subcarriers in the frequency domain without interfering with one another even with part thereof overlapping.

SC-FDMA is a transmission system for dividing the frequency band so that a plurality of terminals uses different frequency bands to perform transmission, and thereby enabling interference among the terminals to be reduced. SC-FDMA has the feature that the variation in the transmission power is decreased, and therefore actualizes low power consumption in the terminal and wide coverage.

In LTE, discontinuous reception (DRX) control is applied. The discontinuous reception control is applied in the case that the base station apparatus and the user equipment are connected with each other and that data to communicate does not exit, and the user equipment in the discontinuous reception state receives the Physical Downlink Control Channel (PDCCH) at some intervals i.e. intermittently. In this case, it is essential only that the user equipment receives the PDCCH intermittently instead of all the timing, and it is thereby possible to reduce power consumption in the battery (butter saving). The time duration to intermittently receive the Physical Downlink Control Channel (PDCCH) in the above-mentioned discontinuous reception control is referred to as ON duration of DRX or On-duration. Further, a cycle to On-duration is referred to as the DRX cycle.

In mobile communications, radio link states in uplink and downlink are monitored, and when the radio link state in uplink or downlink deteriorates, to recover the deteriorated radio link state, the radio base station or mobile station UE performs the processing for reestablishing the connection state. For example, the radio base station monitors the radio link quality of uplink signals transmitted from the mobile station, and when the radio link quality deteriorates, is capable of instructing the mobile station to reestablish uplink timing synchronization, or to reestablish the radio link state.

CITATION LIST

Non-Patent Literature

[Non-Patent Literature 1] 3GPP TS 36.211 (V8.3.0), "Physical Channels and Modulation", May 2008

[Non-Patent Literature 2] 3GPP TS 36.300 (V8.4.0), "E-UTRA and E-UTRAN Overall description", March 2008

[Non-Patent Literature 3] 3GPP TS 36.213 (V8.3.0), "E-UTRA Physical layer procedures," 4.2.4 Transmission timing adjustments, May 2008

[Non-Patent Literature 4] 3GPP TS 36.321 (V8.2.0), "E-UTRA MAC protocol specification," 5.2 Maintenance of Uplink Time Alignment, May 2008

[Non-Patent Literature 5] R4-081399, "Out of synchronization detection in E-UTRAN," June 2008

[Non-Patent Literature 6] 3GPP TS36.214, "E-UTRA Physical layer—Measurements," May 2008

SUMMARY OF THE INVENTION

Technical Problem

In addition, in the discontinuous reception state, since Timing Advance that is a control signal to maintain timing synchronization between the radio base station and the mobile station UE is not transmitted from the radio base station to the mobile station UE, the probability that uplink timing synchronization is not maintained is high. When uplink timing synchronization is not maintained, the mobile station UE does not perform uplink transmission.

Thus, in the case of the discontinuous reception state, even when the radio base station and mobile station UE are being connected, the probability that the mobile station UE does not perform uplink transmission is high, and it is thereby difficult to recognize the communication environment from uplink transmission in the radio base station. Accordingly, in the case of the discontinuous reception state, when the radio link state deteriorates in uplink or downlink, the problem exists that it is not possible to recover the deteriorated radio link state properly.

The invention was made in view of the respect, and it is an object of the invention to provide a user equipment and downlink synchronization determining method in the user equipment for enabling a downlink synchronization state to be determined in a discontinuous reception state or in a state in which uplink timing synchronization is not maintained.

Solution to Problem

A user equipment of the invention is characterized by having a receiving section that receives a downlink signal transmitted from a radio base station, a radio link quality measuring section that measures radio link quality of the downlink signal received in the receiving section, a state managing section that manages whether or not communications with the radio base station are in a discontinuous reception state from a monitoring result of a downlink control channel, and a synchronization determining section that determines a downlink synchronization state based on the radio link quality measured in the radio link quality measuring section, when whether or not the communications are in a discontinuous reception state is notified from the state managing section, and the communications are in a connected state in which a radio link is established with the radio base station and in the discontinuous reception state.

According to this constitution, in the discontinuous reception state, since the downlink synchronization state is determined based on the radio link quality of the downlink signal, the user equipment is capable of recognizing the downlink radio link state, and performing suitable processing corresponding to the radio link state without being instructed from the radio base station.

The user equipment of the invention is characterized by switching a synchronization determining scheme for determining a downlink synchronization state in the case where the radio link is established with the radio base station, and is the discontinuous reception state, and in the case where the radio link is established with the radio base station, and is not the discontinuous reception state.

According to this constitution, it is possible to switch to a proper synchronization determining scheme in accordance with respective radio link states in the discontinuous reception state and non-discontinuous reception state.

Technical Advantage of the Invention

According to the invention, it is possible to achieve a user equipment and downlink synchronization determining method in the user equipment for enabling a downlink synchronization state to be determined in a discontinuous reception state or in a state in which uplink timing synchronization is not maintained.

DESCRIPTION OF EMBODIMENTS

Figure 1:
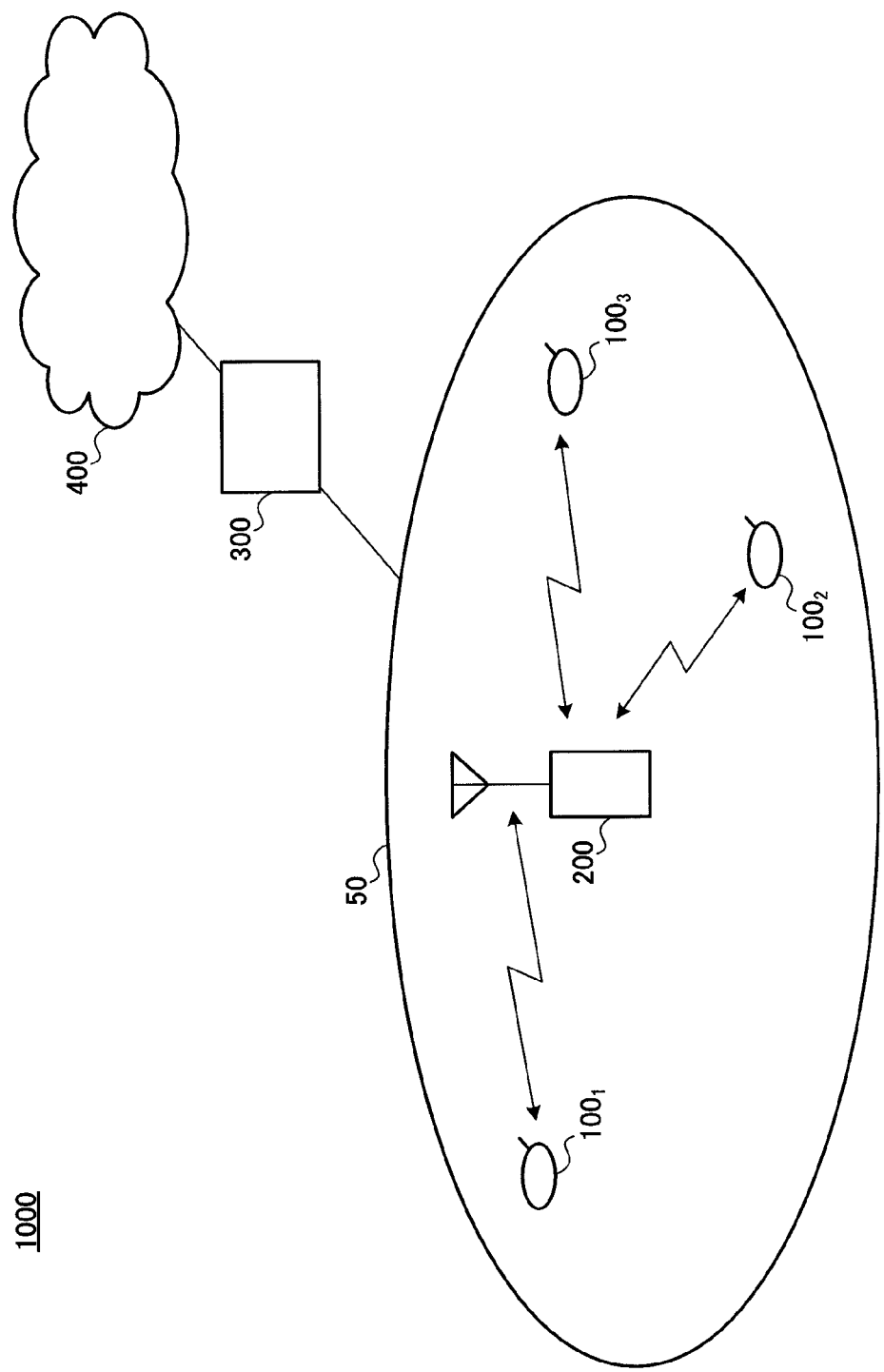
FIG. 1 is a system configuration diagram of a radio communication system to which are applied a mobile station and radio base station according to an Embodiment of the invention.

The best mode for carrying out the invention will be described below based on the following Embodiment with reference to drawings.

In addition, in all the diagrams to explain the Embodiment, components having the same functions are assigned the same reference numerals to omit redundant descriptions.

A radio communication system to which a mobile station and radio base station according to the Embodiment of the invention are applied will be described with reference to FIG. 1.

A radio communication system 1000 is a system to which Evolved UTRA and UTRAN (alias: Long Term Evolution, or Super 3G) is applied, for example, and is provided with a radio base station (eNB: e Node B) 200 and a plurality of mobile stations (UE: User Equipment) $100_n$ ($100_1$, $100_2$, $100_3$, ..., $100_n$, n is an integer where n☐0). The radio base station 200 is connected to an upper station, for example, access gateway apparatus 300, and the access gateway apparatus 300 is connected to a core network 400. Herein, the mobile station $100_n$ communicates with the radio base station 200 in a cell 50 by Evolved UTRA and UTRAN. In addition, the access gateway 300 may be also referred to as MME/SGW (Mobility Management Entity/Serving Gateway).

In the following description, the mobile station $100_n$ ($100_1$, $100_2$, $100_3$, $100_n$, ..., $100_n$) has the same configuration, function and state, and is descried as the mobile station $100_n$ below to give an explanation unless otherwise specified. For convenience in description, the mobile station performs radio communications with the radio base station, and more generally, is user equipment (UE) including a mobile terminal and a fixed terminal.

In the radio communication system 1000, as a radio access scheme, OFDMA (Orthogonal Frequency Division Multiplexing Access) is applied in downlink, while SC-FDMA (Single-Carrier Frequency Division Multiple Access) is applied in uplink. As described above, OFDMA is a system for dividing a frequency band into a plurality of narrow frequency bands (subcarriers), and assigning data onto each frequency band to perform transmission. SC-FDMA is a transmission system for dividing the frequency band so that a plurality of terminals uses different frequency bands to perform transmission, and thereby enabling interference among the terminals to be reduced.

Described herein are communication channels in Evolved UTRA and UTRAN.

In downlink, used are the Physical Downlink Shared Channel (PDSCH) shared among the mobile stations $100_n$, and the Physical Downlink Control Channel (PDCCH). In other words, the downlink channel indicates the Physical Downlink Shared Channel and the Physical Downlink Control Channel. In downlink, on the Physical Downlink Control Channel is notified user information and information of transport format mapped to the Physical Downlink Shared Channel, and user information and information of transport format mapped to the Physical Uplink Shared Channel, and packet data is transmitted on the Physical Downlink Shared Channel. Further, in downlink, in addition to the above-mentioned PDCCH and PDSCH, PHICH (Physical Hybrid Indicator Channel) is transmitted to transmit acknowledgement information for the Physical Uplink Shared Channel.

In addition, the transport channel mapped to the Physical Downlink Shared Channel is the Downlink Shared Channel (DL-SCH). In other words, the packet data is mapped to the DL-SCH. Further, to the DL-SCH are mapped DTCH that is a signal of U-plane and DCCH that is a signal of C-plane as a logical channel, BCCH that is of broadcast information, etc.

Further, the user information and the information of transport format mapped to the Physical Downlink Shared Channel as described above is referred to as the downlink scheduling information. The downlink scheduling information may be also referred to as the downlink assignment information or downlink scheduling grant. Meanwhile, the user information and the information of transport format mapped to the Physical Uplink Shared Channel is referred to as the uplink scheduling grant. The downlink scheduling information and uplink scheduling grant may be collectively referred to as the downlink control information.

Moreover, in downlink, a downlink reference signal (DL RS) is transmitted as a pilot signal. For example, the downlink reference signal is used in channel estimation and measurement of the radio link quality in downlink in the mobile station.

In uplink, used are the Physical Uplink Shared Channel (PUSCH) shared among the mobile stations $100_n$, and the Physical Uplink Control Channel (PUSCH). In addition, in uplink of LTE, the CQI, scheduling request and acknowledgement information for DL-SCH is multiplexed onto the PUSCH and transmitted when the PUSCH is transmitted in the sub-frame, while being transmitted using the Physical Uplink Control Channel when the PUSCH is not transmitted in the sub-frame. In addition, when the control signal of the CQI, scheduling request, acknowledgement information and the like is multiplexed onto the PUSCH and transmitted, the control signal may be configured to be mapped onto the PUSCH, or the control channel to which the control signal is mapped may be configured to be multiplexed onto the PUSCH.

In addition, in uplink of LTE, the Physical Random Access Channel (PRACH) for random access is used, in addition to the Physical Uplink Shared Channel and Physical Uplink Control Channel.

As described above, in uplink of LTE, on the physical Uplink Shared Channel or the Physical Uplink Control Channel is transmitted the downlink quality information (CQI: Channel Quality Indicator) used in scheduling and adaptive modulation and coding scheme (AMCS) of the shared channel in downlink, and the acknowledgement information (HARQ ACK information) for the Physical Downlink Shared Channel in downlink. Further, the packet data is transmitted on the Physical Uplink Shared Channel.

In addition, the transport channel mapped to the Physical Uplink Shared Channel is the Uplink Shared Channel (UL-SCH). In other words, the packet data is mapped to the UL-SCH.

In addition, for example, the aforementioned packet data is IP packets by Web browsing, FTP, VoIP, etc., control signals for the processing of Radio Resource Control (RRC) and the like. The packet data may be also referred to as user data. Further, for the packet data, the designation as a transport channel may be the DL-SCH or UL-SCH, for example, and the designation as a logical channel may be the Dedicated Traffic Channel (DTCH) or Dedicated Control Channel (DCCH), for example.

Figure 2:
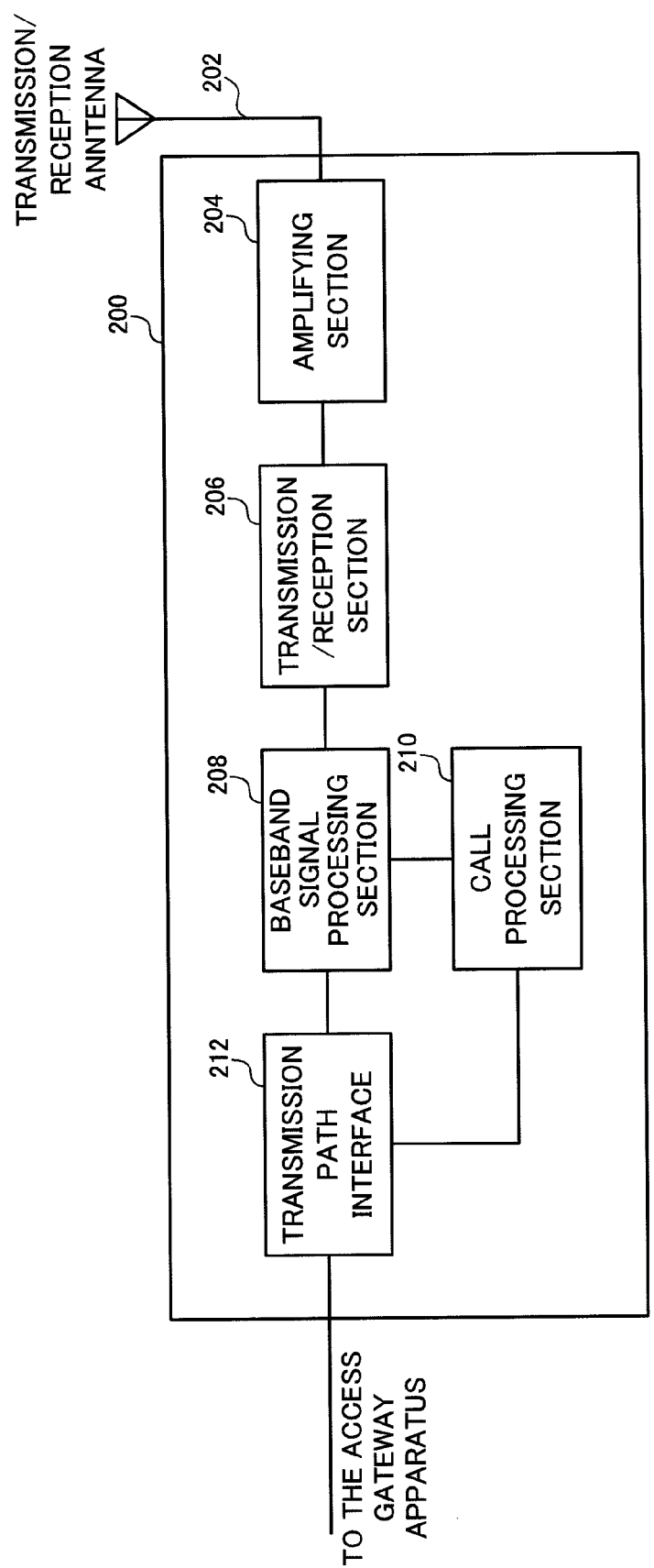
FIG. 2 is a functional block configuration diagram of the radio base station according to the Embodiment.

The radio base station 200 according to this Embodiment will be described with reference to FIG. 2.

The radio base station 200 is provided with a transmission/reception antenna 202, amplifying section 204, transmission/reception section 206, baseband signal processing section 208, call processing section 210 and transmission path interface 212.

The packet data transmitted from the radio base station 200 to the mobile station $100_n$ in downlink is input to the baseband signal processing section 208 via the transmission interface 212 from an upper station positioned higher than the radio base station 200, for example, access gateway apparatus 300.

The baseband signal processing section 208 performs PDCP layer transmission processing, segmentation and concatenation of packet data, RLC (Radio Link Control) layer transmission processing such as transmission processing of RLC retransmission control, MAC retransmission control e.g. transmission processing of HARQ (Hybrid Automatic Repeat request), scheduling, transmission format selection, channel coding, and Inverse Fast Fourier Transform (IFFT) processing on the data to transfer to the transmission/reception section 206. Further, in addition to the packet data, the broadcast information transmitted from the radio base station 200 to the mobile station $100_n$ on the broadcast channel undergoes the same transmission processing, and is transferred to the transmission/reception section 206.

The transmission/reception section 206 performs frequency conversion processing for converting the baseband signal output from the baseband signal processing section 208 into a signal of a radio frequency band, and then, the signal is amplified in the amplifying section 204, and is transmitted from the transmission/reception antenna 202.

Meanwhile, with respect to the packet data transmitted from the mobile station $100_n$ to the radio base station 200 in uplink, a radio frequency signal received in the transmission/reception antenna 202 is amplified in the amplifying section 204, undergoes frequency conversion in the transmission/reception section 206, is thereby converted into a baseband signal, and is input to the baseband signal processing section 208.

The baseband signal processing section 208 performs FFT processing, IDFT processing, error correcting decoding, reception processing of MAC retransmission processing, reception processing of RLC layer, reception processing of PDCP layer and the like on the input baseband signal, and the signal is transferred to the access gateway apparatus 300 via the transmission path interface 212.

Herein, as described above, the packet data is voice signals in VoIP, and signals transmitted in each application such as FTP, streaming and Web browsing.

The call processing section 210 manages the radio link state between the mobile station $100_n$ and the radio base station 200, further manages the state of the radio base station 200, and performs resource allocation.

Further, the call processing section 210 generates system information notified to the mobile station $100_n$ on the broadcast channel. The system information is transmitted to the mobile station $100_n$ via the baseband signal processing section 208, transmission/reception section 206, amplifying section 204 and transmission/reception antenna 202. For example, the system information is transmitted on the Dynamic Broadcast Channel (D-BCH). In addition, for example, the information transmitted on the Dynamic Broadcast Channel is System Information Block 2 (SIB2), System Information Block 3 (SIB3), System Information Block (SIB4), etc.

Herein, as part of information in the system information, the call processing section 210 transmits Qrxlevmin (or q-Rxlevmin) to the mobile station $100_n$. In addition, the call processing section 210 may set a value of the Qrxlevmin based on the degree of congestion in the cell radius or inside the cell, system bandwidth, the number of mobile stations camping on the cell, information on whether the cell exists in an urban area or in a suburb, and the like.

The Qrxlevmin may be defined as part of information for cell selection.

In addition, described below is an example of out-of-service determination based on Qrxlevmin in a standby state. In addition, the standby state may be an idle state.

The mobile station $100_n$ performs processing of cell selection for selecting a serving cell on which the station is camping in a standby state. More specifically, in the cell selection, the mobile station $100_n$ performs the processing for comparing RSRP that is a reception level of the downlink reference signal with the Qrxlevmin, and when the RSRP is larger than the Qrxlevmin i.e.

RSRP Qrxlevmin, selecting the cell as a serving cell, while in cases except the aforementioned case i.e.

RSRP≤Qrxlevmin, not selecting the cell as a serving cell. In addition, when there is any selectable cell as a serving cell, the mobile station $100_n$ is out of service. Meanwhile, when a plurality of cells such that RSRP☐Qrxlevmin exists, the mobile station $100_n$ selects a cell with the highest RSRP as a serving cell.

In addition, in the above-mentioned determination, the metric such that Srxlev=RSRP−Qrxlevmin is defined, and the processing may be performed for selecting the cell as a serving cell in the case of Srxlev☐0, while not selecting the cell as a serving cell in cases except the aforementioned case i.e. Srxlev≤0. In addition, "selecting the cell as a serving cell" as described above may mean that "the cell meets the determination criterion of cell selection".

Herein, generally, in the mobile communication, it is desirable that the cell radius of uplink and the cell radius of downlink are common. Further, since the transmission power of the mobile station has the upper limit, the cell radius of uplink is subjected to constrains more frequently than the cell radius of downlink. Accordingly, in general cell design, the cell radius of uplink is determined based on the form of the cell such as indoor or outdoor, and urban area or suburb area, and is adjusted so that the cell radius of downlink is in accordance with the cell radius of uplink. Herein, the cell radius of downlink may be adjusted based on the value of Qrxlevmin. For example, when the value of Qrxlevmin is increased, since the cell selection is not performed until the value of RSRP is higher, the cell radius is small as a result. Alternately, when the value of Qrxlevmin is decreased, since the cell selection is performed even when the value of RSRP is lower, the cell radius is large as a result. In other words, in a standby state, since the connection is not established between the radio base station 200 and the mobile station 100$_n$, the radio base station 200 performs adjustments on whether the mobile station 100$_n$ is out of service using the Qrxlevmin.

In addition, for example, the Qrxlevmin may be referred to as the lowest reception level or the lowest required reception level in the cell.

Further, the Qrxlevmin may be notified from the radio base station 200 to the mobile station 100$_n$ as one of information elements in System Information Block Type 1 in the broadcast information. Alternately, the call processing section 210 transmits the Qrxlevmin to the mobile station 100$_n$ by radio resource control message (RRC message). For example, the Qrxlevmin may be notified as part of a handover command signal. Otherwise, the Qrxlevmin may be notified as part of a connection release signal.

In addition, the Qrxlevmin notified to the mobile station 100$_n$ is used as a threshold of the value of RSRP to determine whether or not the mobile station 100$_n$ is camping inside a service area in an idle state i.e. standby state.

Further, the Qrxlevmin notified to the mobile station 100$_n$ may be used as a threshold of the value of RSRP to determine whether or not the mobile station 100$_n$ is located inside a service area when the mobile station 100$_n$ is in an RRC connected state and in a discontinuous reception state (DRX state).

Furthermore, the Qrxlevmin notified to the mobile station 100$_n$ may be used as a threshold of the value of RSRP to determine whether or not the mobile station 100$_n$ is located inside a service area when the mobile station 100$_n$ is in an RRC connected state and timing synchronization is not established in uplink.

In addition, for example, being located inside a service area means that being located inside an area enabling communications in terms of radio link quality. Alternately, for example, the mobile station 100$_n$ located inside a service area means that the mobile station 100$_n$ is located in an area in which the mobile station 100$_n$ is capable of establishing the synchronization state in uplink or downlink.

Figure 3:
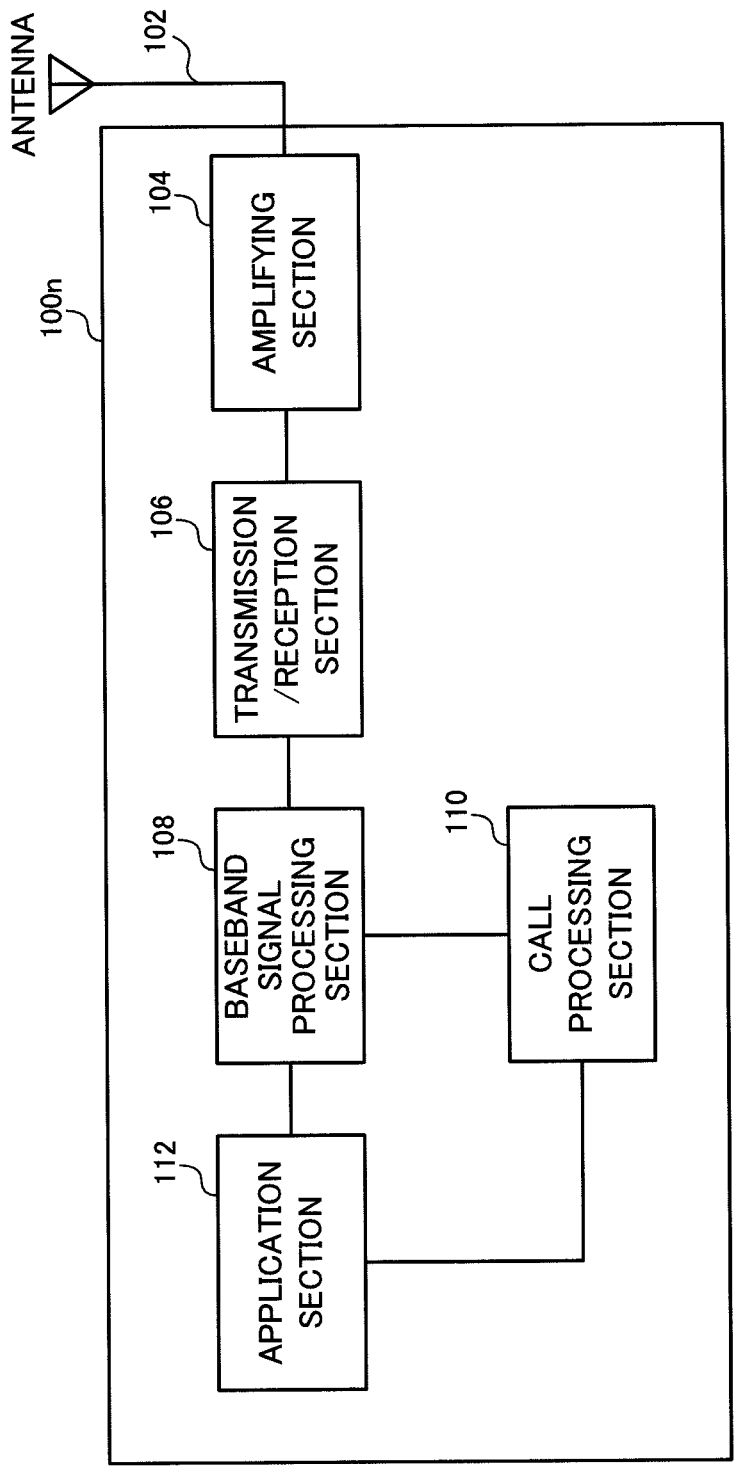
FIG. 3 is a functional block configuration diagram of the mobile station according to the Embodiment.

The mobile station 100$_n$ according to the Embodiment of the invention will be described below with reference to FIG. 3. The mobile station 100$_n$ has an antenna 102, amplifying section 104, transmission/reception section 106, baseband signal processing section 108, call processing section 110 and application section 112.

A downlink signal transmitted from the radio base station 200 is received in the antenna 102, and the radio frequency signal received in the antenna 102 is amplified in the amplifying section 104, subjected to frequency conversion in the transmission/reception section 106, and is thereby converted into a baseband signal. The baseband signal is subjected to reception processing such as FFT processing and error correcting decoding in the baseband signal processing section 108.

In addition, as described later, the baseband signal processing section 108 measures the radio link quality in downlink using a downlink reference signal. Then, the determination processing on the downlink synchronization state is made based on the quality information of downlink.

Meanwhile, the uplink packet data is input to the baseband signal processing section 108 from the application section 112. The baseband signal processing section 108 performs PDCP layer processing, segmentation and concatenation of the packet data, RLC (Radio Link Control) layer transmission processing such as transmission processing of RLC retransmission control, MAC layer transmission processing such as transmission processing for retransmission control (H-ARQ (Hybrid ARQ)), channel coding, DFT processing and Inverse Fast Fourier Transform (IFFT) processing on the data to transfer to the transmission/reception section 106. The transmission/reception section 106 performs frequency conversion processing for converting the baseband signal input from the baseband signal processing section 108 into a signal of a radio frequency band, and then, the signal is amplified in the amplifying section 104, and is transmitted from the transmission/reception antenna 102.

In addition, for example, the aforementioned packet data is IP packets by Web browsing, FTP, VoIP, etc. and control signals for processing of radio resource control (RRC). Further, for the packet data, the designation as a logical channel is the Dedicated Traffic Channel (DTCH), and the Dedicated Control Channel (DCCH).

Figure 4:
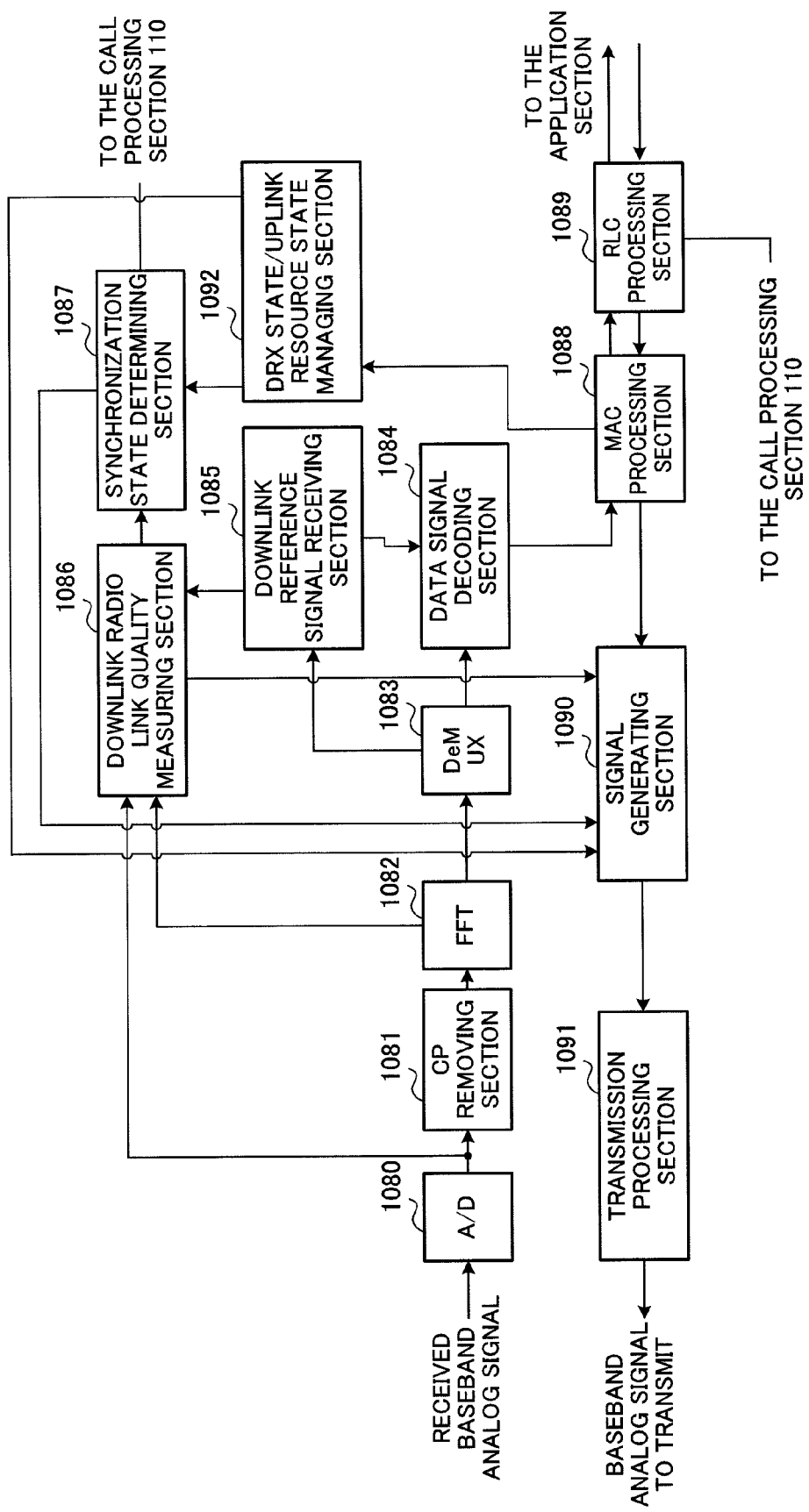
FIG. 4 is a configuration diagram of a baseband signal processing section provided in the mobile station according to the Embodiment.

The configuration of the baseband signal processing 108 will be described below with reference to FIG. 4.

The baseband signal processing section 108 is provided with an analog/digital converter (A/D) 1080, CP removing section 1081, FFT 1082, DeMUX 1083, data signal decoding section 1084, downlink reference signal receiving section 1085, downlink radio link quality measuring section 1086, synchronization state determining section 1087, MAC processing section 1088, RLC processing section 1089, signal generating section 1090, transmission processing section 1091, and DRX state/uplink resource state managing section 1092.

The analog/digital converter (A/D) 1080 converts an analog signal of the base band input from the transmission/reception section 106 into a digital signal, and inputs the digital signal to the CP removing section 1081.

The CP removing section 1081 removes CP from a reception symbol, leaves an effective symbol portion, and inputs the effective symbol portion to the FFT 1082. The Fast Fourier Transform section (FFT) 1082 performs Fast Fourier Transform on the input signal, performs demodulation of OFDM system, and inputs the demodulated signal to the demultiplexing section (DeMUX) 1083.

The demultiplexing section (DeMUX) 1083 demultiplexes the downlink reference signal and data signal from the reception signal, and inputs the downlink reference signal to the downlink reference signal receiving section 1085, and the data signal to the data signal decoding section 1084.

The downlink reference signal receiving section 1085 performs channel estimation based on the input downlink reference signal, and determines channel compensation to perform on the received data signal. In other words, the section 1085 calculates a channel estimation value. The downlink reference signal receiving section 1085 inputs the calculated channel estimation value to the data signal decoding section 1084. Further, the downlink reference signal receiving section 1085 inputs the downlink reference signal and channel estimation value to the downlink radio link quality measuring section 1086.

The data signal decoding section 1084 receives the channel estimation result from the downlink reference signal receiving section 1085, compensates the downlink data signal based on the channel estimation result, and decodes the data signal transmitted from the radio base station 200. Herein, the data signal is signals on the broadcast channel, downlink shard channel and downlink control channel transmitted from the radio base station 200. Herein, more specifically, the above-mentioned broadcast channel is the Physical Broadcast Channel (D-BCH) and the Dynamic Broadcast Channel (D-BCH). Meanwhile, the downlink control channel is DL scheduling information, UL scheduling grant, etc. mapped to the Physical Downlink Control Channel (PDCCH). Further, the data signal decoding section 1084 may perform the decoding processing on the Physical HARQ Indicator Channel (PHICH) with the acknowledgement information for the uplink shared channel mapped thereto, in addition to the above-mentioned channels.

The data signal decoding section 1084 inputs the decoded data signal to the MAC processing section 1088. Further, the data signal decoding section 1084 acquires information included in the P-BCH and D-BCH, and when necessary, notifies each section inside the mobile station 100$_n$ of the information.

The downlink radio link quality measuring section 1086 receives the downlink reference signal and channel estimation value from the downlink reference signal receiving section 1085. Then, based on the downlink reference signal and channel estimation value, the downlink radio link quality measuring section 1086 measures the radio link quality of downlink. Herein, for example, the radio link quality of downlink is a CQI (Channel Quality Indicator), reception SIR of the downlink reference signal, received power of the downlink reference signal (RSRP: Reference Signal Received Power), RSRQ, etc.

More specific descriptions are given below.

For example, the downlink radio link quality measuring section 1086 calculates the SIR of the downlink reference signal, and may calculate a CQI using the SIR and a reference table as shown in Table 1. Table 1 shows the correspondence between the CQI and the value of SIR.

TABLE 1

| CQI | Value of SIR [dB] (described as X below) |
|---|---|
| 0 | X ☐ −3.5 dB |
| 1 | −3.5 dB ≤ X ☐ −1.5 dB |
| 2 | −1.5 dB ≤ X ☐ 0.5 dB |
| 3 | 0.5 dB ≤ X ☐ 2.5 dB |
| . | . |
| . | . |
| . | . |
| 15 | 24.5 dB ≤ X |

In addition, the values as shown in Table 1 are examples, and different values may be set as appropriate. Further, the values of SIR shown in Table 1 are SIRs enabling reception with a predetermined error rate or less, for example, in receiving a data signal of a predetermined modulation scheme, the number of resource blocks, and data size, and the values may be evaluated beforehand, and set based on the evaluation result.

Figure 5:
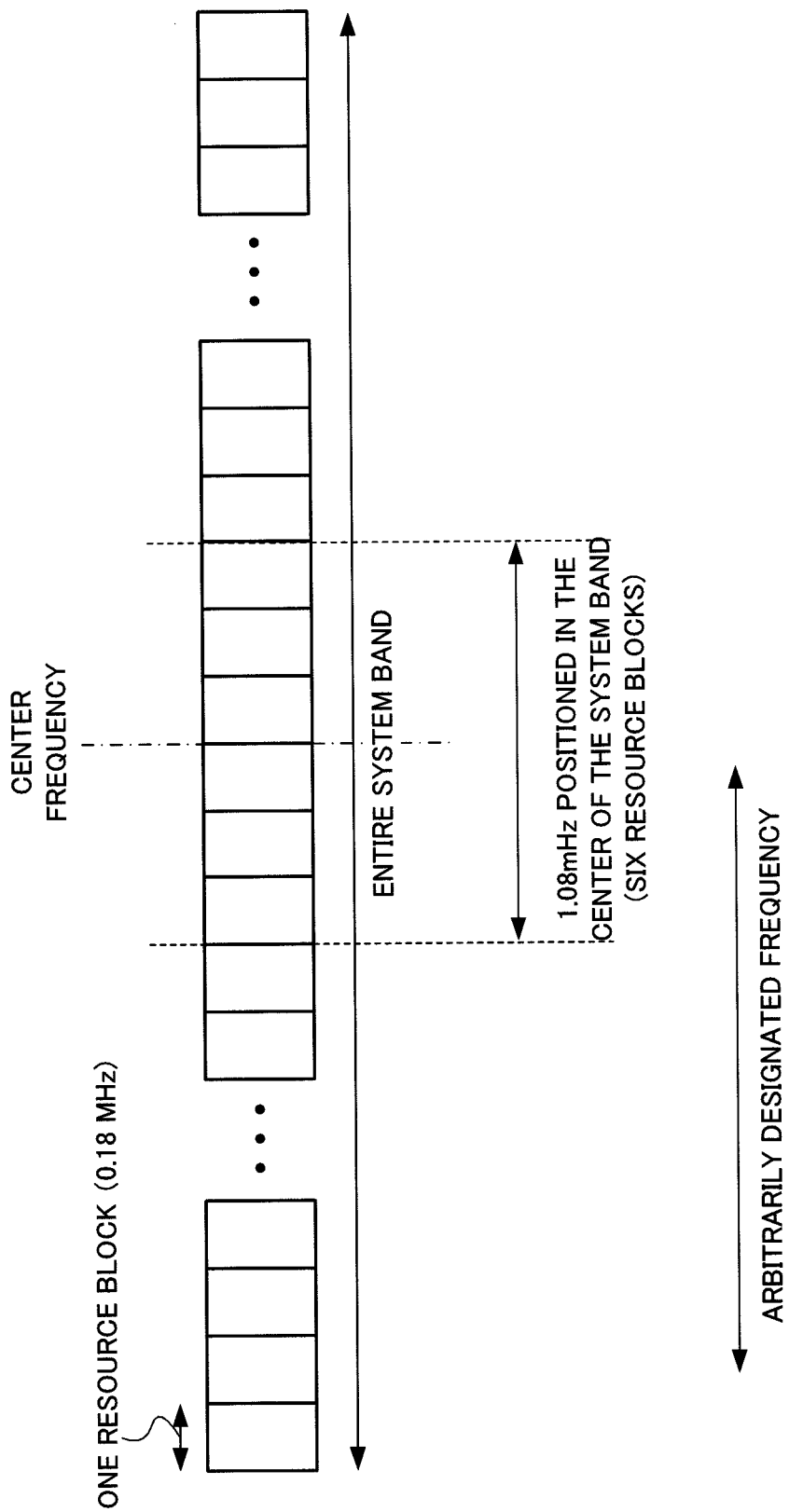
FIG. 5 is a diagram to explain a method of calculating a CQI value in the Embodiment.

Herein, as shown in FIG. 5, the downlink radio link quality measuring section 1086 may calculate an average value on frequency bands of the entire system band, or calculate an average value on frequency bands positioned in the center of the system band i.e. the frequency band of 1.08 MHz including the center frequency of the system band. In FIG. 5, six resource blocks including the center frequency of the system band are shown. In FIG. 5, the horizontal axis represents the frequency. The frequency band of 1.08 MHz positioned in the center of the system band is a frequency band to transmit the Synchronization Chanel (SCH or synchronization signal) in LTE. Alternately, the section 1086 may calculate a CQI value for each resource block, or more flexibly, may calculate a CQI value on the frequency band set arbitrarily in the system band. In addition, the average value on the frequency bands of the entire system band may be referred to as Wideband CQI.

Figure 6:
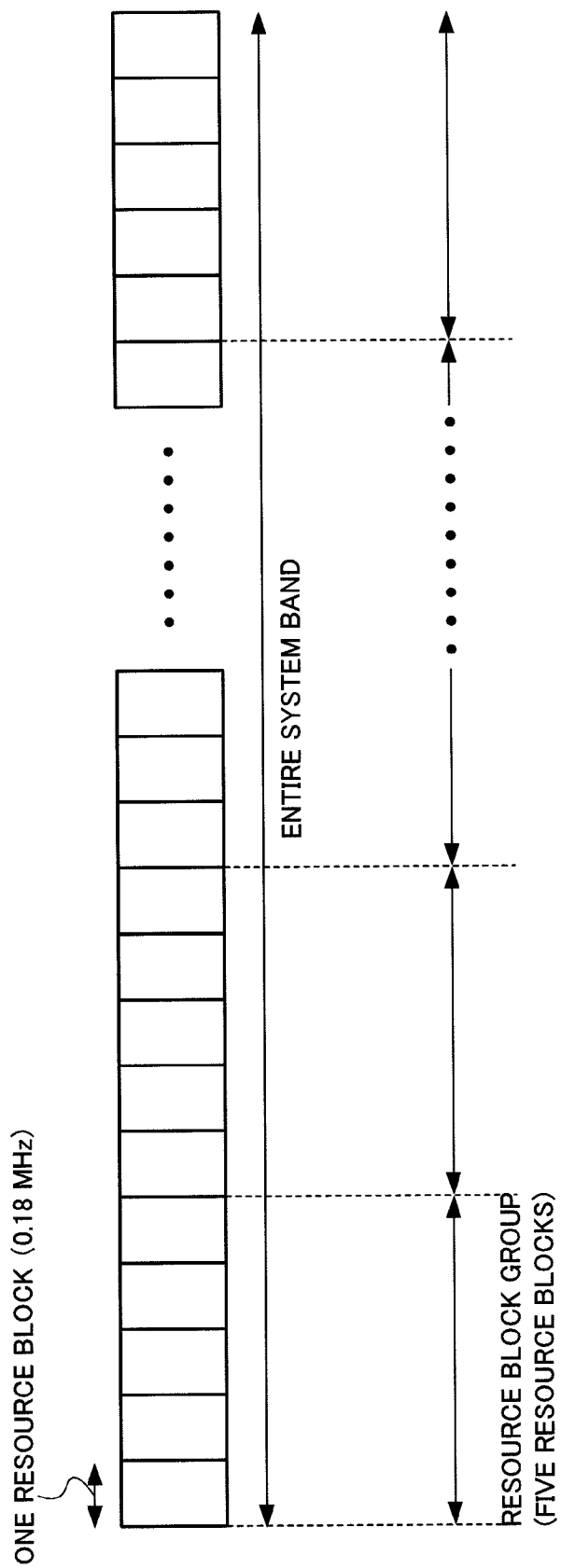
FIG. 6 is a diagram to explain another method of calculating a CQI value in the Embodiment.

Alternately, as shown in FIG. 6, the section 1086 may calculates a CQI value for each frequency band (hereinafter, referred to as a resource block group) obtained by grouping a plurality of resource blocks. FIG. 6 shows the case where five resource blocks are grouped to be a single resource block group, as an example. In FIG. 6, the horizontal axis represents the frequency. Further, in the case of calculating a CQI value for each resource block or each resource block group, the section 1086 may calculate CQI values of M (M is an integer, where M☐0) resource blocks or resource block groups in descending order of the CQI value. The value of M is designated by the broadcast information or RRC message from the radio base station 200. Alternately, the mobile station 100$_n$ calculates all the CQI values of the resource blocks or resource block groups, and may report the calculated value for each resource block or resource block group to the radio base station 200. In addition, the CQI value for each resource group may be also referred to as Subband CQI. Further, in the aforementioned example, the number of resource blocks in a single resource block group is "5", but may be values other than "5".

Then, the downlink radio link quality measuring section 1086 inputs the calculated CQI value to the synchronization state determining section 1087 and signal generating section 1090.

Alternately, the downlink radio link quality measuring section 1086 may input the SIR of the downlink reference signal calculated to obtain the above-mentioned CQI value to the synchronization state determining section 1087 as the radio link quality in downlink. In addition, also in this case, as in the CQI, the measurement period in the frequency domain may be the entire system band, six resource blocks positioned in the center of the system band, and a resource block group obtained by grouping some resource blocks.

Further, the downlink radio link quality measuring section 108 calculates the RSRP as the radio link quality of downlink, and inputs the RSRP to the synchronization state determining state 1087. The RSRP (Reference Signal Received Power) is the received power of the downlink reference signal. The downlink radio link quality measuring section 1086 calculates the received power (RSRP: Reference Signal Receive Power) of the downlink reference signal, using the downlink reference signal and channel estimation value input from the downlink reference signal receiving section 1085 (see Non-patent Document 6 for the definition of the received power of the downlink reference signal). In addition, also with respect to the RSRP, as in the CQI, the measurement period in the frequency domain may be the entire system band, six resource blocks positioned in the center of the system band, and a resource block group obtained by grouping some resource blocks.

Alternately, the downlink radio link quality measuring section 1086 calculates RSRQ as the radio link quality of downlink, and inputs the RSRQ to the synchronization state determining section 1087. The RSRQ (Reference Signal Received Quality Power) is a value obtained by dividing the received power of the downlink reference signal by the RSSI (Received Signal Strength Indicator) of downlink. Herein, the RSSI is the total received level observed in the mobile station, and the received level including all of thermal noise, the interfering power from other cells, power of a desired signal from the cell and the like. In addition, also with respect to the RSRQ, as in the CQI, the measurement period in the frequency domain may be the entire system band, six resource blocks positioned in the center of the system band, and a resource block group obtained by grouping some resource blocks. In addition, when the downlink radio link quality measuring section 1086 measures the RSRQ, as shown in FIG. 4, the baseband signal processing section may be configured so that the signal subjected to Fast Fourier Transform in FFT 1082 is directly input to the downlink radio link quality measuring section 1086, or may be configured so that the signal before being input to the CP removing section 1081 is directly input to the downlink radio link quality measuring section 1086.

The synchronization state determining section 1087 receives the CQI value, and the SIR, RSRP and RSRQ of the downlink reference signal. Further, the synchronization state determining section 1087 receives Qrxlevmin transmitted via the broadcast channel or RRC message from the radio base station 200. Then, based on the CQI value, the SIR, RSRP and RSRQ of the downlink reference signal and the like, the synchronization state determining section 1087 determines the downlink synchronization state.

Figure 7:
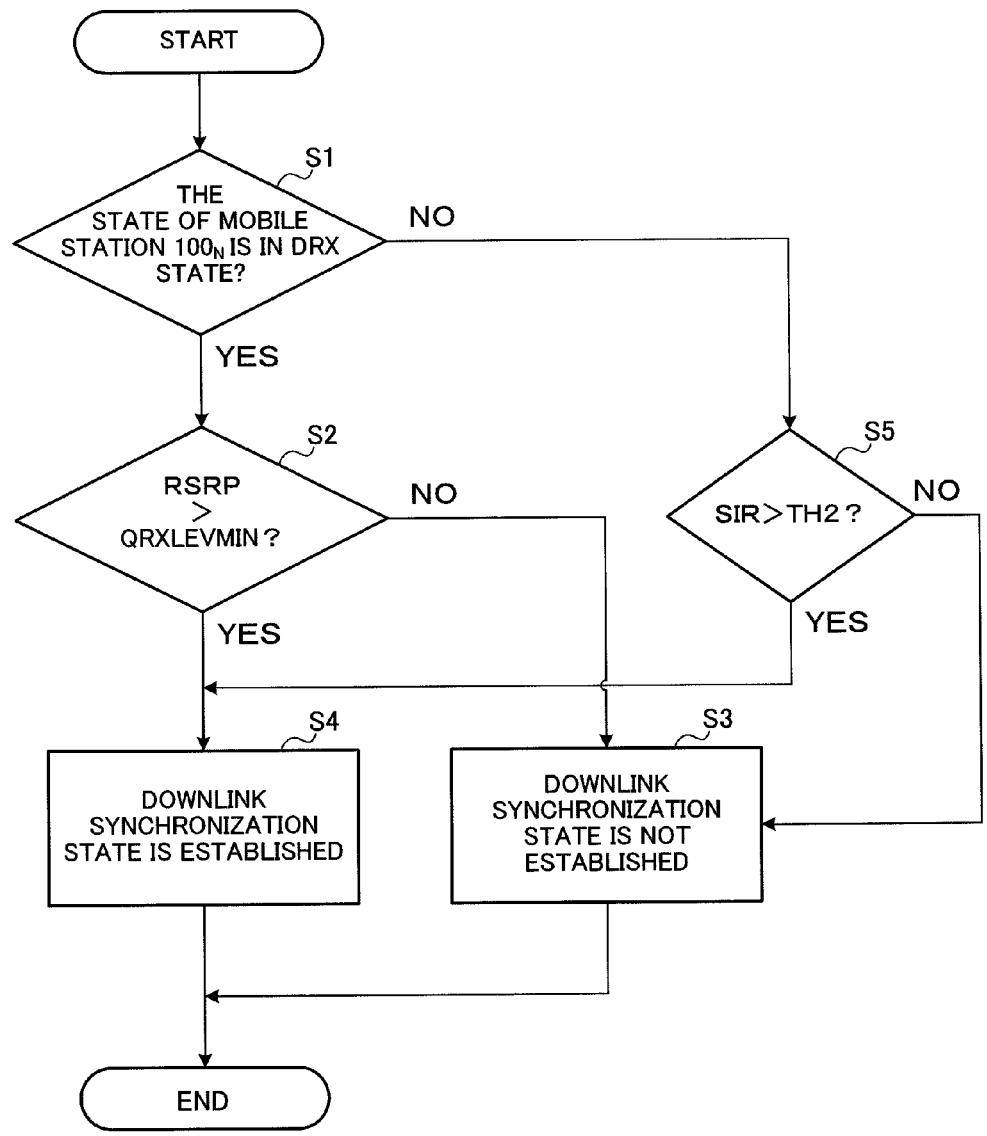
FIG. 7 is a flow diagram for downlink synchronization determination in the Embodiment.

Herein, the synchronization state determining section 1087 may determine the downlink synchronization state according to a flow diagram as shown in FIG. 7, based on whether or not the mobile station $100_n$ is the discontinuous reception state (DRX state). In addition, in the following description, it is the premise that the mobile station $100_n$ is in the RRC connected state. In addition, the RRC connected state indicates that the connection is constructed between the radio base station 200 and mobile station $100_n$ from the viewpoint of the RRC layer.

For example, when the mobile station $100_n$ is the discontinuous reception state (DRX state) (step S1), the synchronization state determining section 1087 determines the downlink synchronization state using the RSRP and the Qrxlevmin (step S2). In other words, when the value of RSRP is less than the Qrxlevmin, the synchronization state determining section 1087 determines that synchronization is not established (step S3), while when the value of RSRP is the Qrxlevmin or more, determining that synchronization is established (step S4). For example, as a value of the Qrxlevmin, the value of −130 dBm may be set. In addition, the value of −130 dBm is an example, and any values other the aforementioned value may be set. In addition, when the synchronization state determining section 1087 determines the synchronization state using the RSRP value, the section 1087 may make the determination using hysteresis. For example, the section 1087 may determine that synchronization is not established when the RSRP value is less than Qrxlevmin in the state in which synchronization is determined to be established, while determining that synchronization is established when the RSRP value is "Qrxlevmin+2 dB" or more in the state in which synchronization is determined not to be established. In addition, 2 dB as described above corresponds to hysteresis.

In addition, in the aforementioned example, "being the discontinuous reception state (DRX state)" may mean that "DRX Inactivity Timer expires." In other words, "the discontinuous reception state (being the DRX state)" may be a state in which packet data to transmit and receive in uplink and downlink does not exist, and the user equipment monitors the PDCCH that is the downlink control channel only during On-duration in DRX control. Alternately, inversely, "being not the discontinuous reception state (DRX state)" is a state in which parameters associated with DRX are not set, or parameters associated with DRX are set, and the DRX inactivity timer is running, the Mac contention resolution timer is running, a scheduling request for the PUCCH is pending, the timing is retransmission timing of uplink HARQ retransmission, or the user equipment does not receive the PDCCH with C-RNTI of the use equipment designated after receiving an RA response for the explicitly notified RA preamble. In this case, states except the aforementioned states correspond to the discontinuous reception state (DRX state).

Herein, the synchronization state determining section 1087 may determine that downlink synchronization between the mobile station $100_n$ and the radio base station 200 is not established when the state in which the RSRP value is less than the Qrxlevmin lasts for a predetermined time interval T1 or more in the state in which downlink synchronization is determined to be established. In addition, in the above-mentioned example, instead of performing the processing for "determining that downlink synchronization between the mobile station $100_n$ and the radio base station 200 is not established when the state in which the RSRP value is less than the Qrxlevmin lasts for a predetermined time interval T1 or more", the section 1087 may perform processing for "determining that downlink synchronization between the mobile station $100_n$ and the radio base station 200 is not established when the state in which the RSRP value is less than the Qrxlevmin lasts the predetermined number of measurement times or measurement occasion T1 or more". Herein, alternately, the section 1087 may determine that downlink synchronization between the mobile station $100_n$ and the radio base station 200 is not established when the rate of the time the RSRP value is less than the predetermined threshold Qrxlevmin in the predetermined time interval T1 is a predetermined threshold TH1 or more in the state in which downlink synchronization is determined to be established. In addition, the aforementioned predetermined time interval T1 may be, for example, 200 ms. Alternately, the value of aforementioned TH 1 may be set, for example, at 50%. In addition, the aforementioned values of 200 ms and 50% are examples, and values except the aforementioned values may be set.

Meanwhile, the synchronization state determining section 1087 may determine that downlink synchronization between the mobile station $100_n$ and the radio base station 200 is established when an even that the RSRP value is the Qrxlevmin or more occurs at least once in the state in which downlink synchronization is determined not to be established. Alternately, the synchronization state determining section 1087 may determine that downlink synchronization between the mobile station $100_n$ and the radio base station 200 is established when the state in which the RSRP value is the Qrxlevmin or more lasts for a predetermined time interval T1 or more in the state in which downlink synchronization is determined not to be established. In addition, in the above-mentioned example, instead of performing the processing for "determining that downlink synchronization between the mobile station $100_n$ and the radio base station 200 is established when the state in which the RSRP value is the Qrxlevmin or more lasts for a predetermined time interval T1 or more", the section 1087 may perform processing for "determining that downlink synchronization between the mobile station $100_n$ and the radio base station 200 is established when the state in which the RSRP value is the Qrxlevmin or more lasts the predetermined number of times or measurement occasion T2 or more". Alternately, the section 1087 may determine that downlink synchronization between the mobile station $100_n$ and the radio base station 200 is established when the rate of the time the RSRP value is the Qrxlevmin or more in the predetermined time interval T1 is the predetermined threshold TH1 or more in the state in which downlink synchronization is determined not to be established. In addition, as a value of aforementioned T1, for example, the value of 200 ms may be set. Alternately, as a value of aforementioned TH1, for example, the value of 50% may be set. In addition, the aforementioned values of 200 ms and 50% are examples, and values except the aforementioned values may be set. Further, in the case where communications between the radio base station 200 and mobile station 100n are in the discontinuous reception state, in the processing of step S2, the received power of the downlink reference signal is compared with the threshold Qrxlevmin, but in the invention, the downlink synchronization determining scheme in the case of the discontinuous reception state is not limited to comparison between the received power of the reference signal and Qrxlevmin. For example, such a determining scheme may be adopted that the CQI of the downlink reference signal, the received level of the reference signal, or RSRQ is compared with a threshold notified from the radio base station 200. In addition, also in this case, it is desirable that the downlink synchronization determining scheme in the case of the discontinuous reception state is the same as the method of an out-of-service determination or cell selection determination in a standby state. When the synchronization determining scheme in the discontinuous reception state is made the same as the out-of-service determination in a standby state, it is possible to reduce complexity of implementation of the mobile station. Alternately, for example, in the processing of step S2, some of the CQI of the downlink reference signal, received level (RSRP) of the reference signal and RSRQ may be compared with the threshold notified from the radio base station 200 to make the downlink synchronization determination.

Meanwhile, when the mobile station $100_n$ is not in the discontinuous reception station (DRX state) i.e. in Non-DRX state, the synchronization state determining section 1087 may determine the downlink synchronization state using the SIR of the downlink reference signal and threshold TH2.

In other words, when the value of SIR of the downlink reference signal is less than the threshold TH2 (step S5), the synchronization state determining section 1087 determines that downlink synchronization is not established (step S3), while when the value of SIR of the downlink reference signal is TH2 or more (step S5), determining that downlink synchronization is established (step S4). For example, as a value of the threshold TH2, the value of −6 dB may be set. In addition, the aforementioned value of −6 dB is an example, and any values other the aforementioned value may be set. In addition, when the synchronization state determining section 1087 determines the synchronization state using the SIR of the downlink reference signal, the section 1087 may make the determination using hysteresis. For example, the section 1087 may determine that synchronization is not established when the SIR of the downlink reference signal is less than TH2 in the state in which synchronization is determined to be established, while determining that synchronization is established when the SIR of the downlink reference signal is "TH2+2 dB" or more in the state in which synchronization is determined not to be established. In addition, 2 dB as described above corresponds to hysteresis.

Herein, the synchronization state determining section 1087 may determine that downlink synchronization between the mobile station $100_n$ and the radio base station 200 is not established when the state in which the SIR of the downlink reference signal is less than predetermined TH2 lasts for a predetermined time interval T2 or more in the state in which downlink synchronization is determined to be established. In addition, in the above-mentioned example, instead of performing the processing for "determining that downlink synchronization between the mobile station $100_n$ and the radio base station 200 is not established when the state in which the SIR of the downlink reference signal is less than TH2 lasts for a predetermined time interval T2 or more", the section 1087 may perform processing for "determining that downlink synchronization between the mobile station $100_n$ and the radio base station 200 is not established when the state in which the SIR of the downlink reference signal is less than TH2 lasts the predetermined number of measurement times or measurement occasion T2 or more". Herein, alternately, the section 1087 may determine that downlink synchronization between the mobile station $100_n$ and the radio base station 200 is not established when the rate of the time the SIR of the downlink reference signal is less than the predetermined threshold TH2 in the predetermined time interval T2 is a predetermined threshold TH3 or more in the state in which downlink synchronization is determined to be established. In addition, for example, the aforementioned predetermined time interval T2 may be, for example, 200 ms. Alternately, as a value of aforementioned TH3, for example, the value of 50% may be set. In addition, the aforementioned values of 200 ms and 50% are examples, and values except the aforementioned values may be set.

Meanwhile, the synchronization state determining section 1087 may determine that downlink synchronization between the mobile station $100_n$ and the radio base station 200 is established when an even that the SIR of the downlink reference signal is TH2 or more occurs at least once in the state in which downlink synchronization is determined not to be established. Alternately, the synchronization state determining section 1087 may determine that downlink synchronization state between the mobile station $100_n$ and the radio base station 200 is established when the state in which the SIR of the downlink reference signal is TH2 or more lasts for a predetermined time interval T2 or more in the state in which downlink synchronization is determined not to be established. In addition, in the above-mentioned example, instead of performing the processing for "determining that downlink synchronization between the mobile station $100_n$ and the radio base station 200 is established when the state in which the SIR of the downlink reference signal is TH2 or more lasts for a predetermined time interval T2 or more", the section 1087 may perform processing for "determining that downlink synchronization between the mobile station $100_n$ and the radio base station 200 is established when the state in which the SIR of the downlink reference signal is TH2 or more lasts predetermined number of times or measurement occasion T2 or more". Alternately, the section 1087 may determine that downlink synchronization between the mobile station $100_n$ and the radio base station 200 is established when the rate of the time the SIR of the downlink reference signal is TH2 or more in the predetermined time interval T2 is a predetermined threshold TH3 or more in the state in which downlink synchronization is determined not to be established. In addition, the value of the aforementioned T2 may be set, for example, at 200 ms. Alternately, as a value of aforementioned TH3, for example, the value of 50% may be set. In addition, the aforementioned values of 200 ms and 50% are examples, and values except the aforementioned values may be set.

In addition, for example, the above-mentioned threshold TH2 may be set as a parameter in the mobile station $100_n$. Further, when communications between the radio base station 200 and mobile station $100_n$ are not in the discontinuous reception state, in the processing of S5 the reception SIR of the downlink reference signal is compared with the threshold TH2, but the invention is not limited, in the downlink synchronization determining scheme when the state is not the discontinuous reception state, to comparison between the reception SIR of the reference signal and the threshold TH2. For example, such a determining scheme may be adopted that a threshold TH4 is compared with the CQI of the downlink reference signal, received level of the reference signal, or RSRQ.

Described below is the reason why RSRP is not used as the radio link quality to determine the downlink synchronization state in the Non-DRX state.

Generally, it is considered that the SIR is an indicator more indicating quality of communications than the received power RSRP. For example, even when the received power RSRP is high, the quality of communications deteriorates in the case where the interfering power or noise power is high. Meanwhile, when the received power RSRP is high while the interfering power or noise power is high, since the part of I is larger in the SIR, the value of SIR is smaller, and it is made possible to directly indicate the deteriorated quality of communications.

Meanwhile, in general, the aforementioned part of I in the SIR is a value varying intensely by congestion status of other cells, fading and the like, and the value of SIR itself varies largely. In this case, for example, in the above-mentioned downlink synchronization state, the probability is high that the determination of "the downlink synchronization state is established/not established" fluctuates.

In other words, the SIR is allowed to indicate the quality of communications more directly than the received power RSRP, but there is the tendency that fluctuations increase in the determination of the synchronization state.

In the light of the aforementioned characteristics, in the DRX state in which transmission and reception of packet data is not performed, to suppress fluctuations in the determination of the synchronization state, the received RSRP is used. Meanwhile, in the Non-DRX state in which transmission and reception of packet data is performed, even when the demerits exist that fluctuations in the determination of the synchronization state are large, the SIR is used which enables the quality of communications to be indicated more directly. By performing such control, the control of using the SIR indicating the quality of communications more directly is effective. In other words, by using the different radio link quality (RSRP and SIR) between the DRX state and Non-DRX state as described above, it is possible to make the determination of the synchronization state suitable for each of the DRX state and Non-DRX state.

Moreover, the downlink synchronization state may be configured to be determined based on whether or not the mobile station $100_n$ is in a state in which uplink resources are released, instead of determining the downlink synchronization state based on whether or not the mobile station $100_n$ is in the discontinuous reception state (DRX state) as described above. The state in which uplink resources are released indicates a state in which uplink timing synchronization is not maintained between the radio base station 200 and mobile station $100_n$. Herein, the state in which uplink timing synchronization is not maintained may mean a state in which a time alignment timer expires, or a state in which the time alignment timer is not started. In addition, the information of whether or not the uplink resources are released is managed in the DRX state/uplink resource state managing section 1092 and notified to the synchronization state determining section 1087, as described later.

Figure 8:
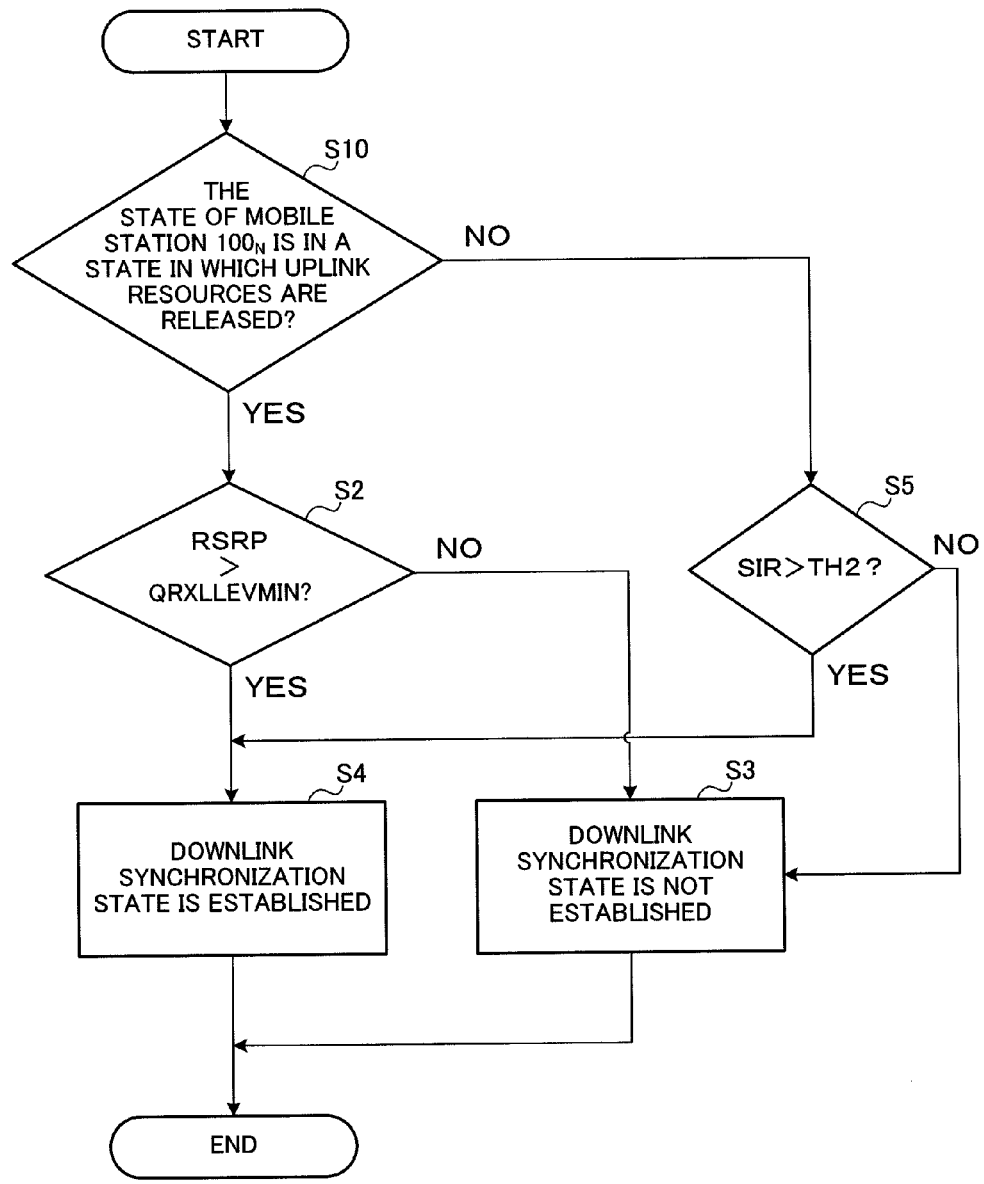
FIG. 8 is another flow diagram for downlink synchronization determination in the Embodiment.

FIG. 8 is a flow diagram to determine the downlink synchronization state based on whether or not the mobile station $100_n$ is in the state in which radio resources are released. The mobile station 100n starts or restarts the time alignment timer from the timing of receiving Timing Advance from the radio base station 200, and determines that uplink timing synchronization is not maintained at the time the time alignment timer expires. In the discontinuous reception state, generally, since the radio base station 200 and mobile station $100_n$ do not exchange data, Timing Advance is not transmitted. In other words, in the discontinuous reception state, there are many cases that uplink timing synchronization is not maintained. Accordingly, as shown in FIG. 8, instead of the discontinuous reception state, the uplink resource release state is determined (step S10), and it is possible to configure so that the determining scheme for determining the downlink synchronization state is switched between step S2 and step S5 that are different determining schemes corresponding to the uplink resource release state.

In addition, the synchronization state determining section 1087 notifies the call processing section 110 (upper layer) and the signal generating section 1090 of the downlink synchronization state of the mobile station $100_n$. In addition, when the state (the state in which the downlink synchronization state is not established) lasts for a predetermined time interval after receiving the information that the downlink synchronization state is not established from the synchronization state determining section 1087, the call processing section 110 may determine to reestablish the connection between the radio base station 200 and mobile station 100n, and perform the processing for reestablishing the connection. For example, the processing for reestablishing the connection may be referred to as RRC connection Re-establishment.

The MAC processing section 1088 receives the decoded downlink scheduling information, UL scheduling grant, acknowledgement information for the uplink shared channel, and downlink shared channel from the data signal decoding section 1084.

The MAC processing section 1088 performs the transmission processing such as the determination of the transmission format of the uplink user data and retransmission control (HARQ) in the MAC layer, based on the input UL scheduling grant. In other words, when the section 1088 is instructed to perform communications using the shared channel in uplink from the radio base station 200 by the UL scheduling grant input from the data signal decoding section 1084, the section 1088 performs the transmission processing such as the determination of the transmission format and retransmission control (HARQ) on the packet data existing in the data buffer in the mobile station $100_n$, and outputs the packet data to the signal generating section 1090.

With respect to the downlink, for example, the MAC processing section 1088 performs the reception processing and the like such as MAC retransmission control of the downlink packet data based on the DL scheduling information received from the data signal decoding section 1084.

Further, the MAC processing section 1088 monitors the PDCCH i.e. the downlink scheduling information and uplink scheduling grant transmitted from the radio base station 200 to the mobile station 100$_n$, and notifies the DRX state/uplink resource state managing section 1092 of the monitoring result.

Furthermore, the MAC processing section 1088 receives Timing Advance transmitted from the radio base station 200 to the mobile station 100*n*, and notifies the reception result to the transmission processing section 1091 via the DRX state/uplink resource state managing section 1092 and the signal generating section 1090.

With respect to the uplink, the RLC (Radio Link Control) processing section 1089 performs segmentation and concatenation of the packet data, and RLC (Radio Link Control) layer transmission processing such as transmission processing of RLC retransmission control, and with respect to the downlink, performs segmentation and concatenation of the packet data, and RLC layer reception n processing such as reception processing of RLC retransmission control. In addition, the RLC processing section 1089 may perform the processing of PDCP layer, in addition to the aforementioned RLC layer processing.

Further, the RLC processing section 1089 notifies the call processing section 110 of the information included in the broadcast channel and RRC message transmitted from the radio base station 200.

The signal generating section 1090 receives the downlink synchronization state of the mobile station 100*n* from the synchronization state determining section 1087, while further receiving the CQI value from the CQI calculating section 1086.

The signal generating section 1090 performs generation processing of signals of the uplink shared channel, sounding RS and uplink control channel transmitted in uplink, for example, acknowledgement information for the downlink quality information (CQI) and downlink shared channel, preamble signal (Random Access Channel) for random access, etc. The section 1090 transmits the signals subjected to the aforementioned processing to the transmission processing section 1091.

Further, the signal generating section 1090 may halt transmission in uplink, in receiving the determination result that synchronization is not established on the synchronization state of downlink of the mobile station 100$_n$ from the synchronization state determining section 1087. Alternately, the section 1090 may halt transmission in uplink when the state (the state in which the downlink synchronization state is not established) lasts for a predetermined interval after receiving the determination result that synchronization is not established on the synchronization state of downlink of the mobile station 100$_n$ from the synchronization state determining section 1087. As a result, the mobile station 100$_n$ does not perform transmission of uplink signals when the downlink synchronization state is not established. In addition, for example, the uplink signals are the uplink shared channel, sounding RS, uplink control channel such as, for example, the downlink quality information (CQI) and acknowledgement information for the downlink shared channel, and the like.

Furthermore, the signal generating section 1090 halts transmission in uplink, in receiving the information that the mobile station 100$_n$ is not in the state in which uplink timing synchronization is established between the mobile station 100$_n$ and the radio base station 200 from the DRX state/uplink resource state managing section 1092. In addition, for example, the uplink signals are the uplink shared channel, sounding RS, uplink control channel such as, for example, the downlink quality information (CQI) and acknowledgement information for the downlink shared channel, and the like.

In addition, the signal generating section 1090 may perform the transmission processing only on the random access channel, even in the case that downlink synchronization is not established, or in the state in which uplink timing synchronization is not established between the mobile station 100$_n$ and the radio base station 200. In other words, in the case that downlink synchronization is not established, the signal generating section 1090 halts the transmission processing of signals except the random access channel.

Alternately, the signal generating section 1090 may halt the transmission processing of all the uplink signals including the random access channel when downlink synchronization is not established.

The transmission processing section 1091 performs the transmission processing such as the DFT processing, IFFT processing and CP insertion processing.

Further, the transmission processing section 1091 adjusts the uplink transmission timing based on the Timing Advance notified from the MAC processing section 1088 via the signal generating section 1090.

The DRX state/uplink resource state managing section 1092 receives, from the MAC processing section 1088, the monitoring result of the PDCCH transmitted from the radio base station 200 to the mobile station 100$_n$, and the reception result of the Timing Advance transmitted from the radio base station 200 to the mobile station 100$_n$. Then, the DRX state/uplink resource state managing section 1092 manages the DRX state of the mobile station 100$_n$ based on the monitoring result of the PDCCH. Further, the DRX state/uplink resource state managing section 1092 manages the uplink resource state based on the reception result of the Timing Advance.

The aforementioned operation will specifically be described blow. For example, in the case that the mobile station 100$_n$ is in the Non DRX state, the DRX state/uplink resource state managing section 1092 starts or restarts a DRX Inactive Timer from the timing of receiving the PDCCH indicative of new transmission i.e. downlink scheduling information or uplink scheduling grant from the radio base station 200. Then, the DRX state/uplink resource state managing section 1092 determines that the mobile station 100$_n$ changes from the Non DRX state to the DRX state at the time the DRX Inactive Timer expires. In addition, the DRX state/uplink resource state managing section 1092 determines that the mobile station 100$_n$ changes from the DRX state to the Non DRX state in receiving the PDCCH indicative of new transmission in the case that the mobile station 100$_n$ is in the DRX state. In addition, as the DRX state, two kinds of Short DRX state and Long DRX state may be defined. The DRX state/uplink resource state managing section 1092 notifies the synchronization state determining section 1087 of the information on whether the mobile station 100$_n$ is in the DRX state or Non DRX state.

In addition to the aforementioned determination, for example, in the state in which a scheduling request is pending, the DRX state/uplink resource state managing section 1092 may make the determination that the mobile station 100$_n$ is regarded as being in the Non DRX state. In addition, the scheduling request is a control signal for requesting uplink resource allocation transmitted from the mobile station to the radio base station.

Further, in the state in which uplink timing synchronization is established between the mobile station 100$_n$ and the radio base station 200, the DRX state/uplink resource state managing section 1092 starts or restarts the Time Alignment Timer from the timing of receiving Timing Advance from the radio base station 200. Herein, the Time Alignment Timer is started when the Time Alignment Timer is not started at the timing of receiving the Timing Advance, while being restarted when the Time Alignment Timer is already started at the timing of receiving the Timing Advance. Then, the DRX state/uplink resource state managing section 1092 determines that the mobile station 100$_n$ changes from the state in which uplink timing synchronization is established between the mobile station 100$_n$ and the radio base station 200 to the state in which uplink timing synchronization is not established between the mobile station 100$_n$ and the radio base station 200. The DRX state/uplink resource state managing section 1092 notifies the synchronization state determining section 1087 and the signal generating section 1090 of the information on whether or not the mobile station 100$_n$ is in the state in which uplink timing synchronization is established between the mobile station 100$_n$ and the radio base station 200. In addition, in changing to the state in which uplink timing synchronization is not established, the mobile station 100$_n$ releases uplink resources. In other words, the state in which uplink timing synchronization is established/or not established is almost synonymous with the state in which uplink resources are not released/released. Herein, for example, the uplink resources are resources for the PUCCH and resources for the sounding reference signal. In other words, the mobile station 100$_n$ halts transmission of the PUCCH and transmission of the sounding reference signal.

In addition, the aforementioned uplink timing synchronization may be referred to as Uplink Time Alignment.

The call processing section 110 performs setting and release of communication channels, call processing such as handover, and status management of the mobile station 100$_n$. For example, the call processing section 110 receives the broadcast information and RRC message transmitted from the radio base station 200, and when necessary, notifies each section of the mobile station 100$_n$ of the information included in the broadcast information and RRC message. More specifically, the call processing section 110 receives Qrxlevmin mapped to the broadcast channel or RRC message. Then, section 110 notifies the synchronization state determining section 1087 of the Qrxlevmin.

The application section 112 performs the processing concerning the physical layer and layers higher than the MAC layer, RLC layer and PDCP layer, and the like.

As described above, according to this Embodiment, when the mobile station 100$_n$ is in the discontinuous reception state (or the state in which uplink resources are released), the mobile station 100$_n$ determines the downlink synchronization state using the RSRP and Qrxlevmin notified from the radio base station 200, is thereby capable of properly recognizing the communication status between the mobile station 100$_n$ and the radio base station 200 even during the discontinuous reception state (or the state in which uplink resources are released), and is thus capable of executing the suitable processing corresponding to the communication status even without uplink transmission from the mobile station 100$_n$ to the radio base station 200.

Further, according to this Embodiment, as a threshold to compare with the radio link quality in downlink in the discontinuous reception state (or the state in which uplink resources are released), the mobile station 100$_n$ uses the Qrxlevmin used in the out-of-service determination in an idle state for halting communications with the radio base station 200, and is thereby capable of making a proper synchronization determination. In other words, the Qrxlevmin is a value set for a different value corresponding to the cell form such as indoor cell or outdoor cell, and cell in an urban area or cell in a suburb area, and by using the Qrxlevmin as a threshold to compare with the downlink radio link quality, it is possible to make a downlink synchronization determination corresponding to the cell form. Further, by making the method of synchronization determination in the discontinuous reception state the same as the method of out-of-service determination in the idle state, it is possible to reduce complexity of implementation of the mobile station.

Furthermore, according to this Embodiment, the synchronization determining scheme is switched in the case that the mobile station 100$_n$ is in the discontinuous reception state (or the state in which uplink resources are released) and in the case that the mobile station 100$_n$ is not in the discontinuous reception state (or the state in which uplink resources are not released), and therefore, as described above, the effect is obtained that it is possible to make a synchronization determination suitable for each of the discontinuous reception state and non-discontinuous reception state.

In addition, the above-mentioned Embodiment describes examples in the system to which is applied Evolved UTRA and UTRAN (alias: Long Term Evolution or Super 3G), and the mobile station and downlink synchronization determining method in the mobile station according to the invention are applicable to all the systems in which communications using the shared channel are performed in downlink.

Further, in the above-mentioned description, the expression of "downlink synchronization is not established/lost" is used, and this expression is comparable to the expression of "Downlink Out-of-Synchronization/Downlink In-Synchronization".

For convenience in explanation, specific examples of numerical values are used to promote understanding of the invention, but the numerical values are simply of examples unless otherwise specified, and any suitable values are capable of being used.

As described above, the invention is described with reference to the specific Embodiment, but each Embodiment is merely illustrative, and a person skilled in the art will understand various changes, modifications, alternates and replacements thereof and the like. For convenience in explanation, the apparatuses according to the Embodiment of the invention are described using the functional block diagrams, and such apparatuses may be implemented by hardware, software or combination thereof. The invention is not limited to the above-mentioned Embodiment, and includes various changes, modifications, alternates and replacements thereof and the like without departing from the spirit of the invention.

Industrial Applicability

The invention is applicable to communication systems in which communications using the shared channel are performed in downlink.

The invention claimed is:

1. A user equipment comprising:
a receiving section configured to receive a downlink signal transmitted from a radio base station;
a radio link quality measuring section configured to measure radio link quality of the downlink signal received in the receiving section;
a state managing section configured to manage whether or not communications with the radio base station are in a discontinuous reception state from a monitoring result of a downlink control channel;
a synchronization determining section configured to determine a downlink synchronization state based on the radio link quality measured in the radio link quality measuring section, when whether or not the communications are in a discontinuous reception state is notified from the state managing section, and the communications are in a connected state in which a radio link is established with the radio base station and are in the discontinuous reception state; and wherein the synchronization determining section switches a synchronization determining scheme for determining the downlink synchronization state in the case that the communications are in the connected state in which the radio link is established with the radio base station and are in the discontinuous reception state, and in the case that the communications are in the connected state in which the radio link is established with the radio base station and are not in the discontinuous reception state.

2. The user equipment according to claim 1, wherein the downlink signal is a downlink reference signal, and the first radio link quality is received power of the downlink reference signal.

3. The user equipment according to claim 1, further comprising:

a notification section that notifies an upper layer of information indicating that downlink synchronization is not established when the synchronization determining section determines that downlink synchronization is not established.

4. The user equipment according to claim 1, wherein the radio link quality measuring section measures first reception quality used in the synchronization determining scheme in the case that the communications are in the discontinuous reception state, and second radio link quality used in the synchronization determining scheme in the case that the communications are not in the discontinuous reception state, and the synchronization determining section compares the first radio link quality with a first threshold to determine the downlink synchronization state in the case that the communications are in the discontinuous reception state, while comparing the second radio link quality with a second threshold to determine the downlink synchronization state in the case that the communications are not in the discontinuous reception state.

5. The user equipment according to claim 4, wherein the synchronization determining section determines that downlink synchronization is established when the first radio link quality is higher than the first threshold, while determining that downlink synchronization is not established when the first radio link quality is lower than the first threshold.

6. The user equipment according to claim 4, wherein the synchronization determining section is notified of the first threshold from the radio base station using broadcast information or RRC message.

7. The user equipment according to claim 4, wherein the synchronization determining section uses the minimum received level in a standby state as the first threshold.

8. The user equipment according to claim 7, wherein the minimum received level is Qrxlevmin.

9. The user equipment according to claim 4, wherein the radio link quality measuring section measures the received power of the downlink reference signal as the first radio link quality, while measuring at least one of reception SIR of the downlink reference signal, received level of the downlink reference signal, and channel quality indicator as the second radio link quality, and the synchronization determining section compares the received power of the downlink reference signal with the first threshold in the case that the communications are in the discontinuous reception state, while comparing one of the reception SIR of the downlink reference signal, the received level and the channel quality indicator with the second threshold in the case that the communications are not in the discontinuous reception state.

10. A downlink synchronization determining method in a user equipment, comprising the steps of:

receiving a downlink signal transmitted from a radio base station;

measuring radio link quality of the signal received in downlink;

managing whether or not communications with the radio base station are in a discontinuous reception state from a monitoring result of a downlink control channel;

determining a downlink synchronization state based on the radio link quality measured in the radio link quality measuring section, when the communications are in a connected state in which a radio link is established with the radio base station and are in the discontinuous reception state; and wherein a synchronization determining scheme for determining the downlink synchronization state is switched in the case that the communications are in the connected state in which the radio link is established with the radio base station and are in the discontinuous reception state, and in the case that the communications are in the connected state in which the radio link is established with the radio base station and are not in the discontinuous reception state.

11. The downlink synchronization determining method in the user equipment according to claim 10, further comprising the steps of:

receiving a first threshold notified from the radio base station using broadcast information or RRC message, wherein in the discontinuous reception state, the first threshold is compared with the radio link quality of the signal received in downlink to determine the downlink synchronization state.

* * * * *